United States Patent [19]

Babinski

[11] Patent Number: 5,560,251
[45] Date of Patent: Oct. 1, 1996

[54] BALL NUT AND SCREW ASSEMBLY WITH AN IMPROVED BALL NUT CONNECTOR SYSTEM AND METHOD OF SECURING THE BALL NUT OF THE ASSEMBLY IN OPERATING POSITION

[75] Inventor: James A. Babinski, Saginaw, Mich.

[73] Assignee: Thomson Saginaw Ball Screw Company, Inc., Saginaw, Mich.

[21] Appl. No.: 271,160

[22] Filed: Jul. 6, 1994

Related U.S. Application Data

[63] Continuation-in-part of Ser. No. 197,117, Feb. 16, 1994, abandoned.

[51] Int. Cl.⁶ .................................................. F16H 55/10
[52] U.S. Cl. ........................... 74/459; 403/319; 403/355
[58] Field of Search ............................. 74/459; 403/354, 403/375, 353, 355, 319; 411/104

[56] References Cited

U.S. PATENT DOCUMENTS

| | | | |
|---|---|---|---|
| 3,638,507 | 2/1972 | Orner | 74/424.8 X |
| 3,731,553 | 5/1973 | Nilsson | 74/459 |
| 3,990,375 | 11/1976 | Adams | 112/258 X |
| 4,148,226 | 4/1979 | Benton | |

FOREIGN PATENT DOCUMENTS 875999  5/1953  Germany ............................ 403/353

OTHER PUBLICATIONS

Thomson Saginaw publication "Linear Actuator Technology Guide" p. 18, publication date unknown, but prior art.

*Primary Examiner*—Charles A. Marmor
*Assistant Examiner*—Troy Grabow
*Attorney, Agent, or Firm*—Learman & McCulloch

[57] ABSTRACT

The ball nut and screw assembly includes a ball nut with a radially projecting tang which is received in an aperture in a connector collar for the ball nut. The tang has an axially extending slot which receives a wall portion of the connecting collar. The engagement of the ball nut retainer wall portion or member with the slot locks the ball nut to the connecting collar. If needed, a key can be secured in the aperture to limit axial movement between the tang and the connecting collar. The tang may be manufactured as a separate element having an interlocking slot and projection coupling with the nut.

18 Claims, 3 Drawing Sheets

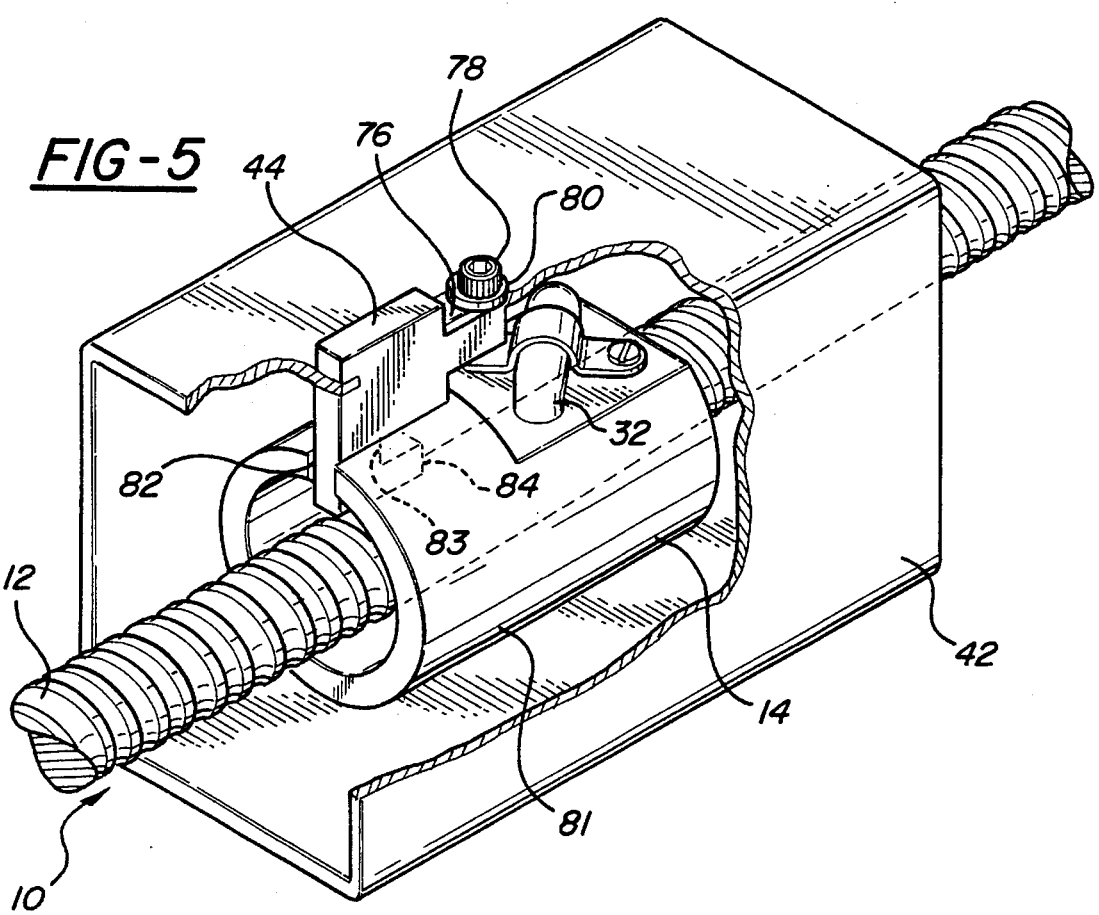
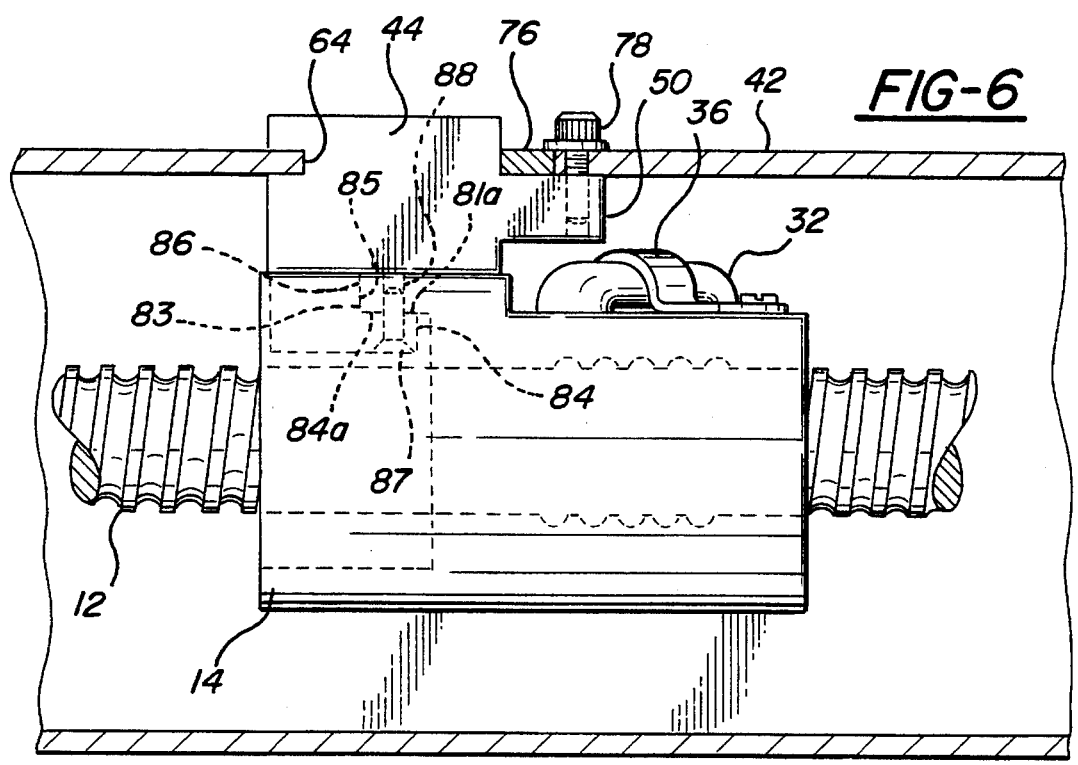

5,560,251

BALL NUT AND SCREW ASSEMBLY WITH AN IMPROVED BALL NUT CONNECTOR SYSTEM AND METHOD OF SECURING THE BALL NUT OF THE ASSEMBLY IN OPERATING POSITION

The present application is a continuation-in-part of application Ser. No. 08/197,117 filed Feb. 16, 1994, abandoned.

TECHNICAL FIELD

This invention relates to ball nut and screw assemblies, and more particularly to an improved system for securing the ball nut in operating position.

BACKGROUND OF THE INVENTION

Ball nut and screw assemblies are employed in a wide variety of industries to change rotary motion to linear motion and move one structural element relative to another element. The screw may be rotatably journalled and axially fixed on one element while the ball nut is fixed to a second element which is translated relative to the screw. Alternatively, axial movement of a non-rotatable screw relative to a rotary ball nut rotates the structural element mounting the nut relative to the structural element mounting the ball screw. Ball nuts are, in practice, attached to various structural elements including tubes or collars. A ball nut and screw mounted inside a tube or other structure will be better protected from foreign elements, such as dirt, sand, and water.

Attaching a ball nut to be disposed in the interior of a tube to the tube, as well as to other structures, can be difficult. A variety of structural arrangements have been used to connect an interior ball nut to a tube or collar which functions to connect the nut to a structural element. Commonly, ball nuts have been provided with flanges for attachment to a bracket having an anti-rotation tang which is passed through an aperture provided in a tube wall. After the tang is inserted through the aperture, it is welded in place to hold the ball nut in a fixed position relative to the tube. When maintenance to the ball nut and screw assembly is required with such an arrangement, a cutting torch is required to release the ball nut from the aperture and the tube wall. Any damage to the ball nut caused by a cutting torch may render the ball nut and/or housing unusable, thereby making replacement necessary.

In other prior art devices, the ball nut flange has been secured to a mounting bracket which has been attached to the tube wall by bolts. The heads of such bolts, in some situations, interfere with translating movement of the tube relative to other fixed structure. Moreover, the removal and replacement of bolts in close quarters inside a long tube can be difficult and time consuming, and the inspection of such bolts to ensure that the nut flange remains rigidly secured to the mounting bracket, during routine servicing and maintenance, is difficult. In fact, access to the bolts that secure the flange may only be possible after partial disassembly of the machine employing the ball nut and screw assembly. Finally, a ball nut with a flange that attaches to a separate mounting bracket inside a tubular collar occupies substantial axial space. The axial space required by the ball nut and the mounting bracket either reduces the range of movement of the structure moved by the ball nut and screw assembly, or increases the required length of the screw.

SUMMARY OF THE INVENTION

The improved ball nut and screw assembly in one embodiment of the invention has a nut with an integrated tang that extends radially relative to the axis of rotation of the screw through a radial aperture in the mounting collar. The tang is provided with a slot which can closely accommodate a wall or retention portion of the collar so that, after the tang is moved radially into the aperture, the tang can then be moved in an axial direction transverse to the direction of radial movement to receive the wall of the collar in the slot in the tang. The wall or retainer portion of the collar cooperates with the slot in the tang to positively prevent relative radial movement of the nut and its connector collar and transmit load through the tang and nut to the screw. In another embodiment of the invention, the tang may be interlocked with the nut in a manner to substantially integrate it with the nut, while accomplishing the same functions and permitting the parts to be more economically manufactured.

It is a prime object of the present invention to provide a ball nut and screw assembly with a ball nut which mechanically mates with its mounting base or collar to obtain structural integrity, and which retains itself in position without the use of conventional fasteners or welds.

A further object of the invention is to provide a ball nut and screw assembly with a ball nut attachment portion that requires minimal axial space when attached to its collar.

Another object of the invention is to provide a ball nut which can be easily and quickly attached to, or removed from, its collar.

Still a further object of the invention is to provide a ball nut and screw assembly of the character described which rigidly handles the loads imparted to it, and which is durable and can be easily and economically manufactured.

Other objects and advantages of the invention will become apparent with reference to the accompanying drawings and the accompanying descriptive matter.

BRIEF DESCRIPTION OF THE DRAWINGS

FIG. 5 is a perspective view of another embodiment of the ball nut and screw assembly of the present invention; and FIG. 6 is an enlarged, sectional, side elevational view thereof.

BRIEF DESCRIPTION OF THE PRIOR ART

Figure 1:
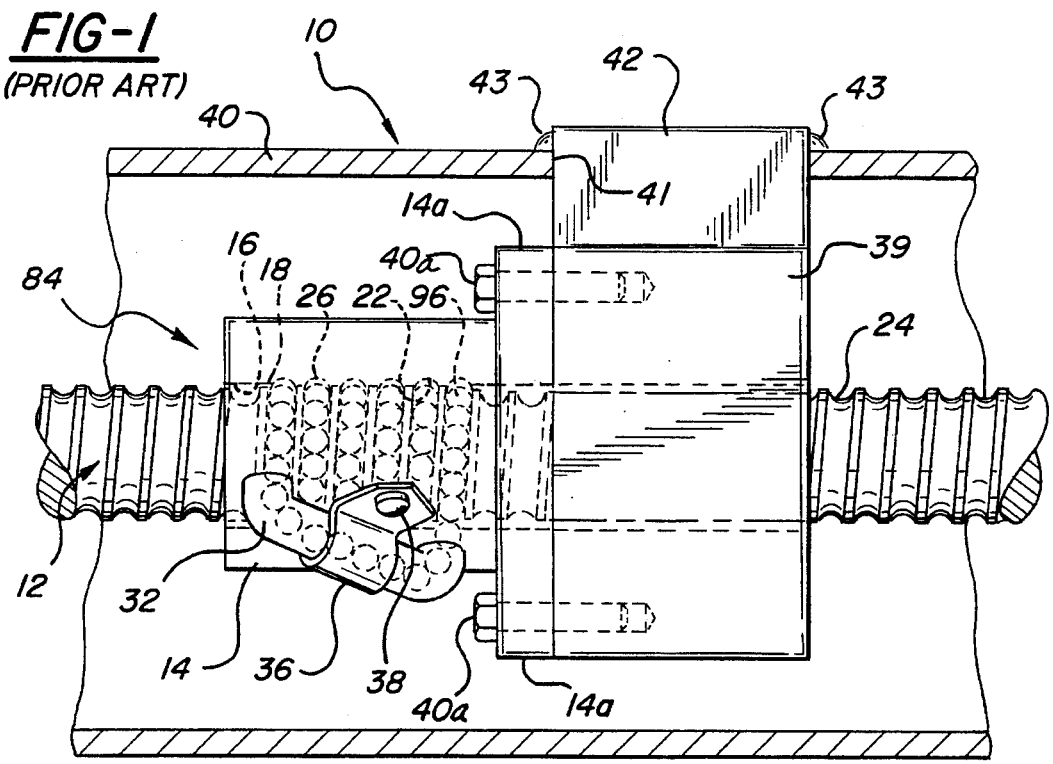
FIG. 1 is a partly sectional side elevational view of a prior art ball nut and screw assembly.

In FIG. 1, a prior art assembly is illustrated and comprises a ball nut and screw assembly, generally indicated 10, consisting of a ball screw 12 and a ball nut 14 which has a cylindrical through bore 16 providing an interior wall 18 which has a helical ball accommodating groove 22 formed therein extending concentrically with the screw axis. The screw 12 has a complementary helical groove 24 which has the same lead or pitch as the groove 22 and so aligns with the nut groove 22 as to form a helical internal ball track 26. A commonly used form of ball return tube 32 is shown as extending through the ball nut to communicate with the axially spaced ends of the helical ball track 26. While the ball tube 32 is shown as an external ball tube secured by a clamp 36 and bolts 38, it is to be understood that, in the prior art, internal ball passages or tubes also have been commonly provided in ball nuts.

In the prior art devices nut flanges 14a have been provided on the nuts 14 so that they can be secured to interior brackets 39 by bolts 40a. It is the brackets 39, then, which are secured to the mounting collar 40 which attaches the assembly to a structural element to be moved.

In the prior art device, a slot 41 is provided in the wall 40. Provided on the bracket 39 is an anti-rotation tang 42 which extends sufficiently through the aperture 41 that it can be welded in position as at 43.

The axial lengths of the flange 14a and bracket 39 increase the effective length of the ball nut assembly and, accordingly, have a minimizing effect on the range of movement of the ball nut and screw assembly when it is the screw 12 which is rotated and the ball nut 14 and collar 40 are translated.

DETAILED DESCRIPTION OF THE PREFERRED EMBODIMENT

Figure 2:
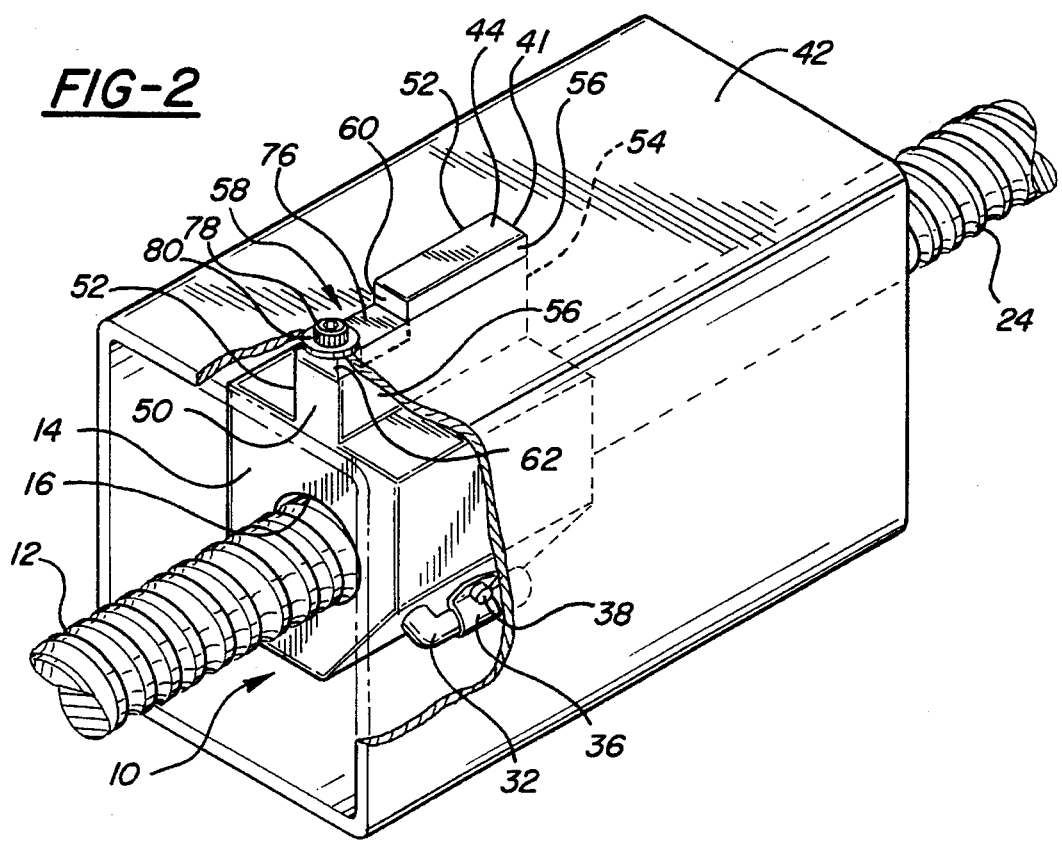
FIG. 2 is a perspective view of the ball nut and screw assembly of this invention mounted in a tubular connector collar, with parts of the collar broken away to better illustrate the invention.
Figure 3:
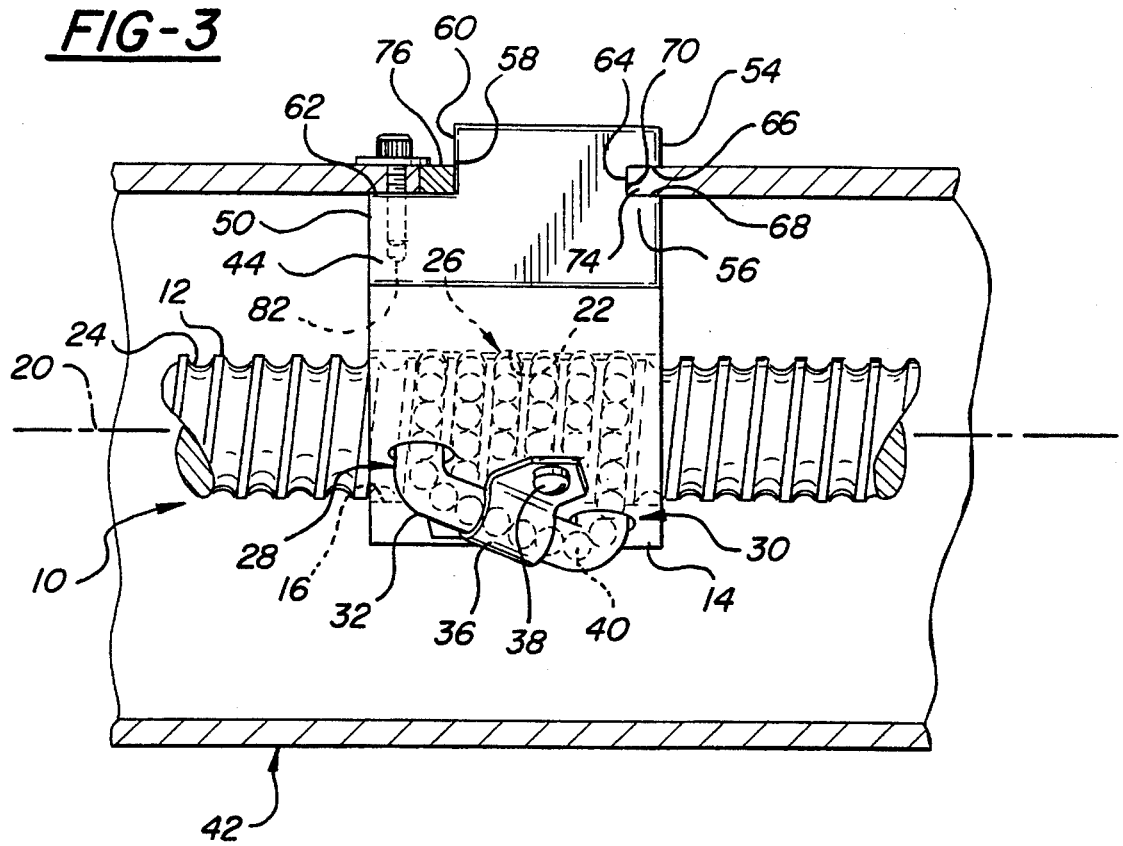
FIG. 3 is a partly sectional, side elevational view of the ball nut and screw assembly.
Figure 4:
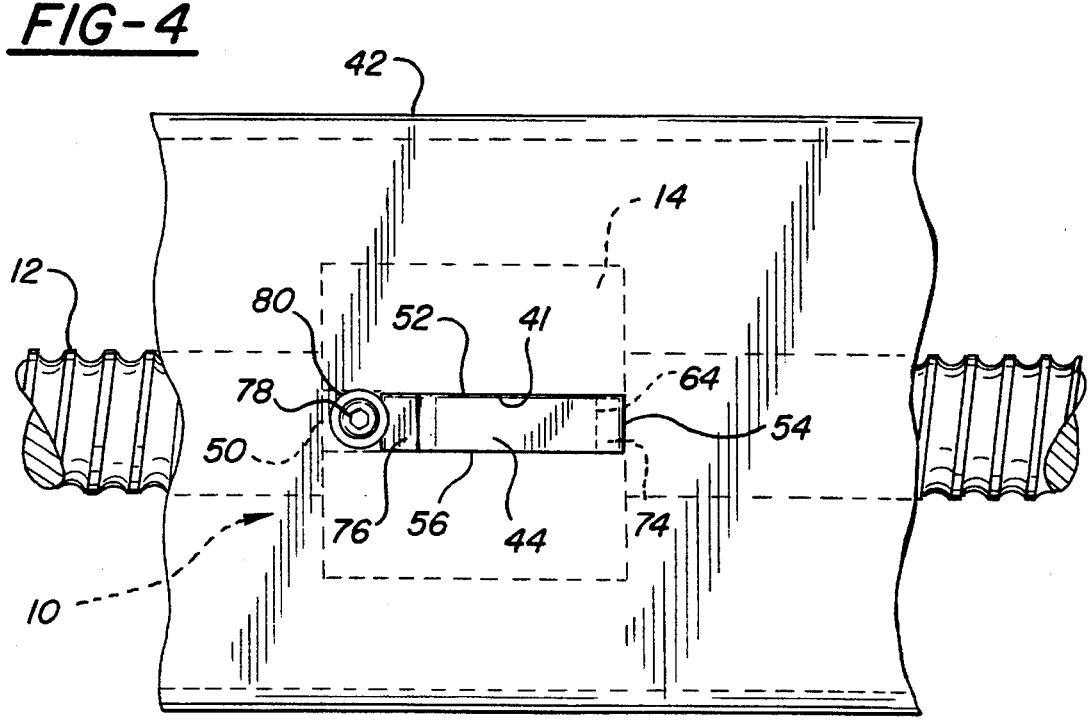
FIG. 4 is a fragmentary top plan view of the ball nut and screw assembly.

The ball nut and screw assembly 10 of the present invention is shown in FIGS. 2–4 of the drawings, with the same numerals applied to identical parts. The screw 12, while shown in a horizontal position, can be vertical as well as horizontal, and could also extend at any desired angle between horizontal and vertical.

In the improved assembly, the ball nut 14 has an integrated tang 44 that extends directly radially from the nut 14 and does not occupy any additional axial space. The aperture 41 has a width equal to the distance between the sides 52 and 56 of the integral tang 44 to closely accommodate it. Tang 44, as shown in the drawings, is a generally rectangular projecting member having end walls 50, 54, and side walls 52, and 56. A step or notch 58 is formed in one corner of the tang 44 in wall 54 to provide a vertical marginal surface 60 parallel to the sides 50 and 54, and a projecting nose portion with a horizontal surface 62 perpendicular to the vertical surface 60 and parallel to the screw and nut axis 20. Opposite to, and in horizontal alignment with the notch 58, a slot 64 is provided in the wall 54 of the integral tang 44. The slot 64 provides a marginal top wall 66, a marginal bottom wall 68, and a marginal base wall 70.

During installation of the ball nut and screw assembly 10, the integral tang 44 is moved radially relative to the bore axis 20 into the aperture 41. After the integral tang 44 has moved the required distance radially into the aperture 41 to align the slot 64 with wall portion 74 and therefore engage nose surface 60 with the top wall of the connector 42 also, the ball nut and tang are moved axially. The slot 64 receives a portion 74 of the collar 42 which may be referred to as a ball nut retainer wall member or portion 74 retainer portion or part 74. The ball nut retainer portion or member 74, when received in the slot 64, prevents radial removal of the tang 44 from the aperture 41.

Ball nut and screw assemblies 10 are employed in many structural arrangements in which they are disposed vertically. In structures in which gravity and the load on the ball nut and screw assembly 10 tend to force the ball nut housing 14 downwardly (to the right in FIGS. 2, 3, and 4) the ball nut 14 is held by the wall portion 74. In such structural arrangements, no further retainers are required to hold the ball nut 14 in a fixed position relative to the collar or mounting base 42. The ball nut and screw assembly 10 can be released for maintenance and repair by merely moving the ball nut housing 14 in a direction opposite to the mounting base 42, and then moving the integral tang 44 radially out of the aperture 41. No tools are required to release the ball nut from the aperture 41 in the mounting base or collar 42 when the parts are so disposed.

Ball nut and screw assemblies 10 that are employed horizontally in structural arrangements, or in vertical arrangements with loads opposing gravitational forces, require a blocking key 76 to retain the ball nut 14 in the aperture 41. The key 76 blocks axial movement of the ball nut 14 (to the left in FIGS. 3 and 4), thereby maintaining the ball nut retainer portion 74 within the slot 64 in the integral tang 44. A threaded fastener 78 and a washer 80 are provided to retain the key 76 in a blocking position. The fastener 78 passes through a hole 79 drilled through the collar 42 and is threaded into a threaded bore 82 in the ball nut 14. The washer 80, held in place by the fastener 78, has an edge which extends to overlie the key 76 and thereby prevent removal of the tang 44 from the aperture 41.

In FIGS. 5 and 6, I have illustrated another embodiment of the invention in which the tang 44 is not machined on the ball nut 14, but is substantially integrated with it as a result of the manner in which it interlocks with the ball nut 14. In illustrating this embodiment of the invention, I have used the same numerals previously used for the same component parts and I will not further describe these parts, which have already been well described.

In the second and presently preferred embodiment, the ball nut 14 has a sleeve wall portion 81 which is provided with an axially extending, radial, through slot 82. It is through this slot 82 that the radially inner end of the tang 44 projects. Provided in the radially inner wall of tang 44 is a notch, generally designated 83, which forms an axially extending projection 84. Because notch 83 is of a radial depth of substantially the thickness of the sleeve wall portion 81, the projection 84 underlies the wall 81 as shown particularly in FIG. 6. The projection 84 has a wall surface 84a which can be arcuated to mate with and engage the interior wall of the sleeve 81 along its interior surface 81a.

In addition to abutting surfaces 81a and 84a, the axially inner marginal wall of the slot 82 provides a flat surface 85 which abuts with the flat wall surface 86 provided as the marginal radial wall of the notch 83 formed in the inner end of the tang 44. A suitable screw fastener or the like 87 may extend as shown from the projection 84 to thread into the threaded opening 88 provided in the wall portion 81.

The abutting wall surfaces 85 and 86 will pass axial loads applied to the nut 14 in either direction to the tang 44 in the same manner as previously. At the same time, any radial loads cannot separate the tang 44 and nut sleeve 81 because of the abutting surfaces 81a and 84a. Thus, the tang 44 is substantially fully integrated with the nut 14 as in the previous embodiment. However, as noted, the embodiment disclosed in FIGS. 5 and 6 will be easier to manufacture than if the tang 44 is an integral part of the nut itself.

It is to be understood that the embodiments described are exemplary of various forms of the invention only and that the invention is defined in the appended claims which contemplate various modifications within the spirit and scope of the invention.

I claim:

1. A ball nut and screw assembly with an improved ball nut retaining system, for mounting and retaining the ball nut on a co-extensive connector, includes: a ball nut having an axis and an interior wall concentric with the nut axis, a helical ball accommodating groove in the nut interior wall, an elongated screw passing axially through the ball nut and having a helical ball accommodating groove that cooperates with the helical ball groove in the nut to form a helical internal ball track with a first end and a second end, a ball return passage in communication with the first and second ends of the helical internal ball track, a plurality of balls forming an endless train of balls in the helical internal ball track and the ball return passage, a connector having a wall with a radially inner face extending parallel to the nut axis which is provided with an axially parallel slot-forming aperture having first and second marginal ends, a tang secured to the ball nut extending generally radially outwardly relative to the nut axis to project through said aperture, the tang having a nose extending parallel to said nut axis axially beyond said first marginal end of said slot to underlie and engage the said inner face of said wall, the tang further having a slot extending parallel to said nut axis intermediate its ends, and the connector wall having a retainer part provided by the portion of said wall adjacent the said second marginal end of said slot received in said slot in the tang to cooperate with said nose to retain the ball nut fixed in position relative to the connector.

2. An assembly as set forth in claim 1 including a key secured in the said aperture to engage said nose and prevent disengagement of the retainer part from the slot in the tang.

3. An assembly as set forth in claim 2 including a fastener for disengageably holding the key in the said aperture.

4. An assembly as set forth in claim 1 in which the connector is a tubular member of rectangular cross-section having walls extending axially in planes parallel to said nut axis within which said ball nut and screw are received.

5. A method of securing the axially extending ball nut of a ball nut and screw assembly to a coextensive connector having a wall extending in longitudinal alignment with the ball nut axis for attaching the ball nut to an element to be moved, and wherein the ball nut has a tang extending radially outwardly relative to the axis of the nut through a slot forming an axially extending aperture in the connector wall which is configured to closely receive the tang, and the tang has a slot extending generally axially parallel to said ball nut configured to closely receive a retainer portion of said wall of the connector, including the steps of:

a) positioning the ball nut axially relative to the connector wall in a position in which said tang is radially adjacent to the aperture in the connector;

b) moving the ball nut in a first radial direction to insert the tang through the aperture in the connector; and c) then moving the ball nut in an axial direction relative and parallel to the connector wall to a position in which the slot provided axially in the tang receives said retainer portion of the connector wall.

6. The method set forth in claim 5 including the step of inserting a key into said aperture to hold the ball nut in an axially fixed position relative to the connector.

7. The method set forth in claim 6 including the step of releasably fastening the key in said aperture.

8. The method set forth in claim 5 wherein said connector is a tubular member and said nut is first of all inserted into said connector.

9. A ball nut and screw assembly with an improved ball nut retaining system for mounting and retaining the ball nut on a co-extensive connector, includes: a ball nut with a wall having an interior wall surface concentric with a ball nut axis, a helical ball accommodating groove in the nut interior wall surface, an elongated screw passing axially through the ball nut, having a helical ball accommodating groove that cooperates with the helical ball groove in the nut to form a helical internal ball track with a first end and a second end, a ball return passage in communication with the first and second ends of the helical internal ball track, a plurality of balls providing a train of balls in the helical internal ball track and the ball return passage, a ball nut connector having a wall extending generally parallel to said nut axis which is provided with an axially extending aperture, a tang, having radially inner and outer ends, secured to the ball nut and having its outer end extending radially outwardly relative to the nut axis to project into said aperture, the tang and connector wall having an axially parallelly extending slot and projection interlock to retain the tang in the aperture in the connector.

10. An assembly as set forth in claim 9 including a key secured in the mounting aperture to prevent disengagement of the interlock.

11. An assembly as set forth in claim 9 in which the ball nut connector is a tubular member having axially extending walls connected with said wall, within which the ball nut and screw assembly is received.

12. The assembly as set forth in claim 9 in which said nut and tang have an axial slot and projection interlock.

13. The assembly as set forth in claim 12 in which said tang and nut interlock includes an axially extending slot through said nut wall of a width to pass and snugly receive the radially inner end of said tang, and said inner end of the tang has an axially extending notch of a radial depth to receive the nut wall, the notch forming an axially extending tang projection which in assembled position underlies the nut wall.

14. The assembly as set forth in claim 13 in which said tang and connector interlock comprises an axially extending slot in said tang between its radially inner and outer ends configured to closely receive the marginal connector wall of the radial aperture in said connector, said slot in the tang extending axially in the same axial direction as said slot in the nut wall; and a fastener extends radially to unite said tang projection and nut wall.

15. A method of securing the axially extending ball nut of a ball nut and screw assembly having respective grooves providing a ball containing ball raceway to a coextensive connector having a wall extending parallel to the nut axis for attaching the ball nut to an element to be moved, and wherein the ball nut has a tang extending radially outwardly relative to the axis of the nut through an aperture in the connector wall configured to receive the tang, and an axially extending slot and projection interlock is provided for the tang and connector wall at one end of the tang, including the steps of:

a) positioning the ball nut axially relative to the connector wall in a position in which said tang is radially aligned with the aperture in the connector wall;

b) moving the ball nut in a first radial direction to insert the tang through the aperture in the connector wall; and c) then moving the axially extending ball nut and axially extending connector wall relatively axially to a position in which the interlock slot and projection are interlocked.

16. The method of claim 15 wherein said tang has an axially projecting nose portion on the opposite end of the tang and, in moving the tang to insert it through the aperture in the connector wall, the nose portion is brought into radial engagement with the connector wall and is in guiding engagement with the connector wall while step c) is performed.

17. A ball nut and screw assembly with an improved ball nut retaining system for mounting and retaining the ball nut on a connector, includes: a ball nut with a wall having an interior wall surface concentric with a ball nut axis, a ball accommodating groove in the nut interior wall surface, an elongated screw passing axially through the ball nut, having a complemental ball accommodating groove that cooperates with the ball groove in the nut to form an internal ball raceway with a first end and a second end, a ball return passage in communication with the first and second ends of the raceway, a plurality of balls providing a train of balls in the raceway and the ball return passage, a ball nut connector having a wall which is provided with an axially extending aperture, a tang, having radially inner and outer ends, secured to the ball nut and having its outer end extending radially outwardly relative to the nut axis to project into said aperture, the tang and connector wall having an axially parallelly extending slot and projection interlock to retain the tang in the aperture in the connector.

18. A ball nut and screw assembly with an improved ball nut retaining system for mounting and retaining the ball nut on a connector, includes: a ball nut with a wall having an interior wall surface concentric with a ball nut axis, a ball accommodating groove in the nut interior wall surface, an elongated screw passing axially through the ball nut, having a complemental ball accommodating groove that cooperates with the ball groove in the nut to form an internal ball track with a first end and a second end, a ball return passage in communication with the first and second ends of the internal ball track, a plurality of balls providing a train of balls in the internal ball track and the ball return passage, a ball nut connector having a wall extending generally parallel to said nut axis which is provided with an axially extending aperture, a tang, with radially inner and outer ends, and having its outer end extending radially outwardly relative to the nut axis to project into said aperture and being fixed to said connector wall, the tang and nut wall having an axially parallelly extending open-ended slot and projection interlock assembly to retain the axial and radial position of the tang relative to the nut.

\* \* \* \* \*